United States Patent
Husoy

(10) Patent No.: US 8,994,848 B2
(45) Date of Patent: Mar. 31, 2015

(54) METHOD AND SYSTEM FOR HANDLING MIXED ILLUMINATION IN VIDEO AND PHOTOGRAPHY

(71) Applicant: Cisco Technology, Inc., San Jose, CA (US)

(72) Inventor: Per Ove Husoy, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 13/803,405

(22) Filed: Mar. 14, 2013

(65) Prior Publication Data

US 2014/0267827 A1 Sep. 18, 2014

(51) Int. Cl.
*H04N 9/73* (2006.01)

(52) U.S. Cl.
CPC ..................................... *H04N 9/735* (2013.01)
USPC ......................... 348/223.1; 348/234; 348/238

(58) Field of Classification Search
USPC ....................... 348/223.1, 234, 238
See application file for complete search history.

(56) References Cited

U.S. PATENT DOCUMENTS

| | | | |
|---|---|---|---|
| 5,021,874 A | 6/1991 | Tsugita | |
| 5,974,272 A | 10/1999 | Kiesow et al. | |
| 2003/0058350 A1* | 3/2003 | Ishimaru et al. | 348/223.1 |
| 2005/0082480 A1 | 4/2005 | Wagner et al. | |
| 2005/0265625 A1* | 12/2005 | Li et al. | 382/274 |
| 2007/0081102 A1 | 4/2007 | Ramanath et al. | |
| 2009/0021526 A1 | 1/2009 | Chiang et al. | |
| 2010/0053381 A1* | 3/2010 | Hasegawa | 348/241 |
| 2012/0218418 A1 | 8/2012 | Strandemar | |

* cited by examiner

*Primary Examiner* — Usman Khan
(74) *Attorney, Agent, or Firm* — Lempia Summerfield Katz LLC

(57) ABSTRACT

A method including: obtaining, with an image processing apparatus, a white point that corresponds to an image captured by a camera with only the natural light as a light source; obtaining, with the image processing apparatus, a white point that corresponds to an image captured by the camera with only the artificial light as a light source; determining, with the image processing apparatus, a ratio of an intensity of natural light for a pixel to an intensity of an artificial light for the pixel within an image captured by a camera under mixed illumination of the natural light and the artificial light; and determining, with the image processing apparatus, a white point for the pixel in the image under mixed illumination based on the ratio of the intensity of natural light to the intensity of artificial light for the pixel in the image, the white point for only the natural light, and the white point for only the artificial light.

17 Claims, 3 Drawing Sheets

METHOD AND SYSTEM FOR HANDLING MIXED ILLUMINATION IN VIDEO AND PHOTOGRAPHY

TECHNOLOGICAL FIELD

The exemplary embodiments described herein relate to spatially dependent mixed illumination correction.

DESCRIPTION OF THE RELATED ART

Imaging scenarios may include illumination sources of different light quality, and may be referred to as mixed illumination scenes. For example, a scene may be illuminated by natural light (i.e., sun light) and high efficiency artificial light (fluorescent lights, compact fluorescent lights, and light emitting diodes). When an object in the scene is illuminated by different illumination sources, the color of the object may vary.

A white point (often referred to as reference white or target white in technical documents) is conventionally a set of tristimulus values or chromaticity coordinates that serve to define the color "white" in image capture, encoding, or reproduction. White balance is the process of removing unrealistic color casts, so that object which appear white in person are rendered white in a photo or video.

BRIEF DESCRIPTION OF THE DRAWINGS

A more complete appreciation of the exemplary embodiments described herein and many of the attendant advantages thereof will be readily obtained as the same becomes better understood by reference to the following detailed description when considered in connection with the accompanying drawings, wherein.

DETAILED DESCRIPTION

Overview

A method including: obtaining, with an image processing apparatus, a white point that corresponds to an image captured by a camera with only the natural light as a light source; obtaining, with the image processing apparatus, a white point that corresponds to an image captured by the camera with only the artificial light as a light source; determining, with the image processing apparatus, a ratio of an intensity of natural light for a pixel to an intensity of an artificial light for the pixel within an image captured by a camera under mixed illumination of the natural light and the artificial light; and determining, with the image processing apparatus, a white point for the pixel in the image under mixed illumination based on the ratio of the intensity of natural light to the intensity of artificial light for the pixel in the image, the white point for only the natural light, and the white point for only the artificial light.

Exemplary Embodiments

Imaging scenarios may include illumination sources of different light quality, and may be referred to as mixed illumination scenes. For example, a scene may be illuminated by natural light (i.e., sun light) and high efficiency artificial light (fluorescent lights, compact fluorescent lights, and light emitting diodes). High efficiency artificial light contains no more than a negligible amount of NIR, and does not include incandescent light. Light emitting diodes, for example, may emit no NIR. When an object in the scene is illuminated by different illumination sources, the color of the object may vary. The exemplary embodiments described herein provide a technique that determines the ratio of natural light to high efficiency artificial light.

In another embodiment, a halogen/incandescent source may take the place of the sun. In this case, the same approach as indicated for the sun in combination with a high efficiency light may be used.

Figure 1:
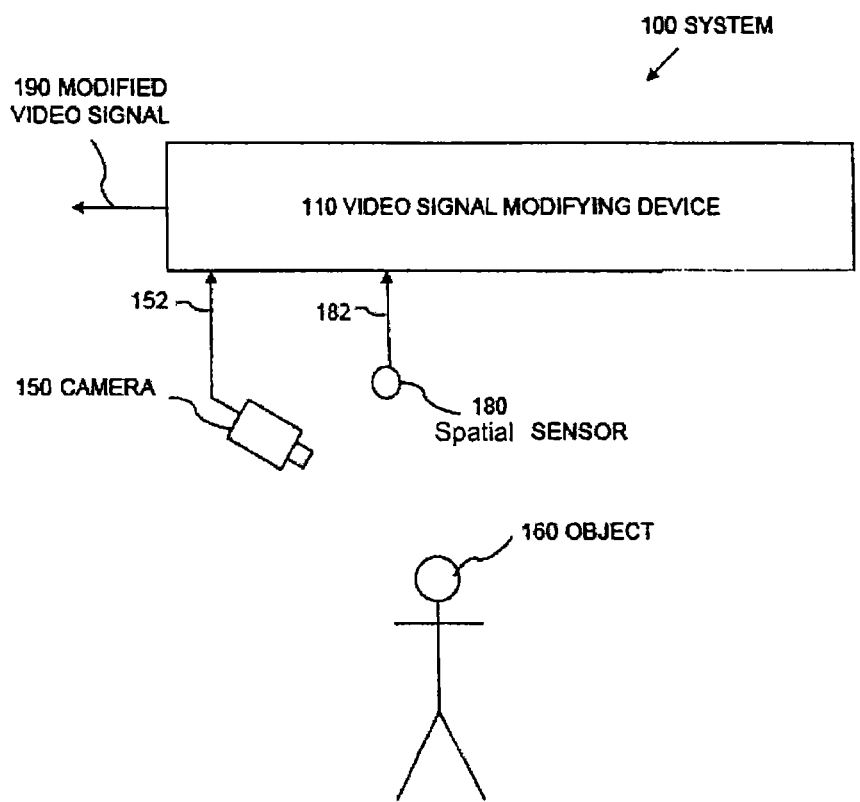
FIG. 1 is an example schematic block diagram illustrating principles of an example system for providing a modified video signal of an object exposed to mixed illumination.

FIG. 1 is a schematic block diagram illustrating principles of a system 100 for handling mixed illumination in video. System 100 may provide a modified video signal 190 of an object 160 exposed to mixed illumination. The mixed illumination may include natural light (sun light) and high efficiency artificial light. The natural light or sun light contains a large amount of energy in the near infrared (NIR) range. The natural light includes near infrared (NIR) wavelengths (1000-1100 nm). The high efficiency artificial light does not include near infrared radiation, or includes no more than an negligible amount that it may be disregarded.

Further, in order to provide the modified video signal 190 as an output, the system 100 includes a video signal modifying device 110 (e.g., a video processing device), which is configured to modify the non-modified video signal 152 in accordance with the exemplary embodiments described below. Details of the video signal modifying device 110 will be later described with reference to FIG. 3.

The exemplary embodiment of FIG. 1 depicts a system 100 that could be used in video conferencing. However, the technological advancement described herein may be used in other applications that use a video camera or a still image camera.

The object 160, which is exposed to the mixed illumination may be a video conference participant (i.e. a user of the terminal equipment), or at least include a face of a conference participant. Alternatively, the object 160 may be any tangible object.

The system 100 comprises a camera 150 which is configured to capture a video signal of the object 160, hereinafter referred to as non-modified video signal 152. The camera 150 may be a digital video camera, which may use a CMOS or CCD two-dimensional sensor chip as a photo-sensitive element. The non-modified video signal 152 provided by the camera 150 contains information about the image captured by the camera 150 with respect to time.

The non-modified video signal 152 may include information representing a time sequence of frames, wherein each frame may be a two-dimensional array of vectors, each vector including a number of values (e.g., three values) which represent the intensity of a particular color of each pixel in the image. Such vectors may be RGB-vectors, and each RGB-vector may correspond to a pixel in one video frame.

The system 100 may further include a spatial sensor 180 that measures NIR energy. Use of the spatial sensor enables the system to determine the intensity of the NIR in conjunction with the RGB-vectors. In the exemplary embodiment of FIG. 1, the combination of the camera 150 and spatial sensor 180 combine to form a sensor which measures light in wavelength bands corresponding to r, g, b and n. r here corresponds to red, the band closest in wavelength to NIR.

By selecting the NIR spectral response of the spatial sensor 180 to be close to the red channel in camera 150, the reflective response of the target for red and NIR will be quite similar. The ratio of the NIR response to the red response will then be proportional to the ratio of sun/(sun+high efficiency artificial light). This ratio may be determined for every spatial location in an image captured by the camera 150. Then a spatially dependent mixed illumination white point correction can be performed.

Spatial sensor 180 may be a group or an array of semiconductor photo-detectors such as photo-diodes, CMOS, or CCD devices.

Spatial sensor 180 may be a NIR camera mounted near camera 150. In this embodiment, a spatial shift due to parallax must be corrected/compensated given that light sensor 180 and camera 150 are not coaxially aligned. Such parallax compensation is known to those of ordinary skill in the art.

In another embodiment, camera 150 and spatial sensor 180 may be combined as a coaxial two channel (visible+NIR) camera. Such coaxial two channel cameras are commercially available. Use of such a coaxial two channel camera avoids the above-noted need for the parallax correction.

In another embodiment, camera 150 may include an images sensor where some pixels are NIR sensitive. These NIR pixels may be interspersed with the normal bayer pattern, for example.

According to an embodiment, the combined NIR signal 182 and non-modified video signal 152 may be represented by a vector with four components, the components indicating the intensity of red, green, blue, and NIR light contribution, respectively (e.g., a vector expressed as [r, g, b, n]).

In the example that follows, the sun light or natural light, which has a significant energy contribution in the NIR range, will be referred to as Light 1 and the high efficiency artificial light, which emits no more than a negligible amount of NIR energy, will be referred to as Light 2. Light 1 and Light 2, together, constitute mixed illumination. Light 2 may include light from more than one high efficiency artificial light source.

For any location in space corresponding to a given pixel in an image captured by camera 150, the observed intensity is proportional to the reflectance [Rr,Rg,Rb,Rn] and the local illumination $k1*[r1,g1,b1,n1]$ for Light 1 and $k2*[r2,g2,b2,n2]$ for Light 2. The k's represents the relative scaling of the local contribution of lights at the given spatial location corresponding to an observed pixel. The reflection coefficients are assumed equal for each band between the two light sources, i.e. Rr1=Rr2, Rg1=Rg2, etc.

The white point (WP) (response from a white patch) of the two different illuminations may be determined, for example, by estimating WP using any existing WP algorithm for single illumination. WP1 (the white point for only Light 1) and WP2 (the white point for only Light 2) may be determined with the camera capturing an image of a white card or grey card illuminated with only one of the light sources at a time using known existing WP algorithm for single illumination.

Alternatively, the white points of the two different illuminations may be determined, for example, by splitting the scene light into single light contributions by turning off the indoor light and subtracting the two images: one with both lights (i.e., sun and artificial) and one with only one light (i.e., only sun).

Regardless of the technique used, the system utilizes the following two expressions regarding WP1 and WP2:

$$WP1=[r1,g1,b1,n1] \quad (1)$$

and $$WP2=[r2,g2,b2,n2] \quad (2).$$

WP1 and WP2 may be stored in the memory of system 100 or determined by system 100 prior to the beginning of video capture (i.e., a video conference) or still image capture.

It is further noted that n2 may be regarded as zero given that Light 2 does not include a significant amount of near infrared light or is known to not include any near infrared light.

The WP3, the white point for the pixel with the mixed illumination of Light 1 and Light 2 is:

$$WP3=[r3,g3,b3,n3]=k1*WP1+k2*WP2 \quad (3).$$

The wavelength limits for the n band and the r band, in the spatial sensor 180 and camera 150 respectively, are chosen so that there is a high correlation between the reflection coefficients Rr and Rn of these bands. Wavelength limits between r and n bands refers to the filter bandwidth and location of cutoff for the spatial sensor that measures NIR. The spatial sensor may be the filter on the chip/pixel (in a single sensor solution) or an external filter in the case of prism based multiple sensor solution (for example a 4 sensor with functionality similar to the normal 3 sensor used in cameras today).

In order to correct for the effective white point at a location with mixture k1 and k2, the ratio a=k1/k2 of the contributing white points WP1 and WP2 is determined. k1, k2 and a will depend on the local light mixture.

For a pixel of interest, the system measures the intensity values [r,g,b,n], along with the assumption that R=Rr=Rn (i.e., the reflection coefficient for red and NIR (n) is the same).

The observed intensity for the NIR (n) in the mixed illumination is:

$$k1*n1*R+k2*n2*R=n \quad (4)$$

Given than n2 is zero (no significant NIR from the high efficiency artificial light), equation (3) reduces to:

$$k1*n1*R-n=0 \quad (5)$$

The observed intensity for the r (red) component in the mixed illumination is:

$$k1*r1*R+k2*r2*R=r \quad (6).$$

Equation (6) may be rewritten as follows $$k1*r1*R+k2*r2*R-r=0 \quad (7).$$

With a=k1/k2, equations (5) and (7) may be combined to result in the following:

$$a=k1/k2=n*r2/(n1*r-n*r1) \quad (8).$$

Since the white balancing at any given point is only concerned with the ratio of the light mixtures, we can set k2=1, and find k1=a.

As noted above in equation (3), WP3=[r3,g3,b3,n3] =k1*WP1+k2*WP2. With k2=1 and k1=a (as explained above), equation (3) reduces to:

$$WP3=a*WP1+WP2 \quad (9).$$

Figure 2:
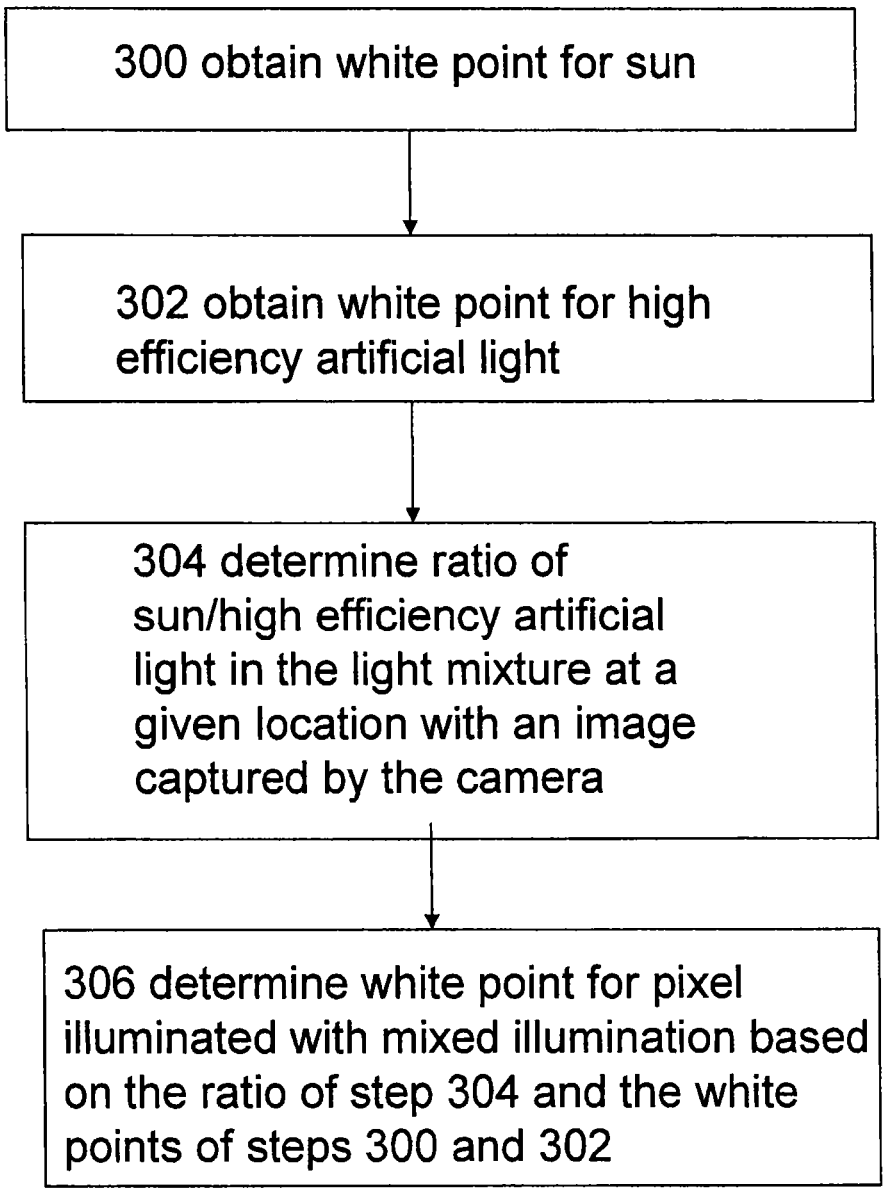
FIG. 2 is an example schematic flowchart illustrating principles of an example method for providing a modified video signal of an object exposed to mixed illumination.

FIG. 2 illustrates an exemplary method of determining a white point for a pixel with mixed illumination. The method may be implemented using hardware depicted in FIGS. 1 and 3.

In an exemplary method, in step 300, the image processing apparatus 110 obtains a white point that corresponds to an image captured by a camera with only the natural light as a light source. This may be accomplished by techniques discussed above, which include but are not limited to obtaining a stored value from a memory that corresponds to the natural light source or using a conventional white point algorithm for single illumination.

In step 302, the image processing apparatus 110 obtains a white point that corresponds to an image captured by the camera with only the high efficiency artificial light as a light source. The image processing apparatus 110 may execute this step in a manner analogous to that of step 300.

Step 304 includes determining, with the image processing apparatus, a ratio of an intensity of natural light for a pixel to an intensity of a high efficiency artificial light for the pixel within an image captured by a camera under mixed illumination of the natural light and the high efficiency artificial light. In step 304, the RGB components of the image with the mixed illumination may be determined with camera 150 and the NIR component of the image with the mixed illumination may be determined with spatial sensor 180, in conjunction with the video signal modifying device 110. The video signal modifying device may be programmed to execute the calculations discussed above for equations (1) to (8) based on the data provided by camera 150 and spatial sensor 180. As noted above, camera 150 and spatial sensor 180 may be separate devices or combined into a single device.

In step 306, the image processing apparatus 110 determines a white point for the pixel in the image under mixed illumination based on the ratio of the intensity of natural light to the intensity of the high efficiency artificial light in the light mixture, the white point for only the natural light, and the white point for only the high efficiency artificial light.

Next, a hardware description of the video signal modifying device 110 according to exemplary embodiments is described with reference to FIG. 3. The equipment of FIG. 3 may be found in a video conference endpoint or computer configured for video conferencing. However, similar elements may also be incorporated into a video camera, still image camera, or a mobile communication device such as a cell phone or tablet computer.

Figure 3:
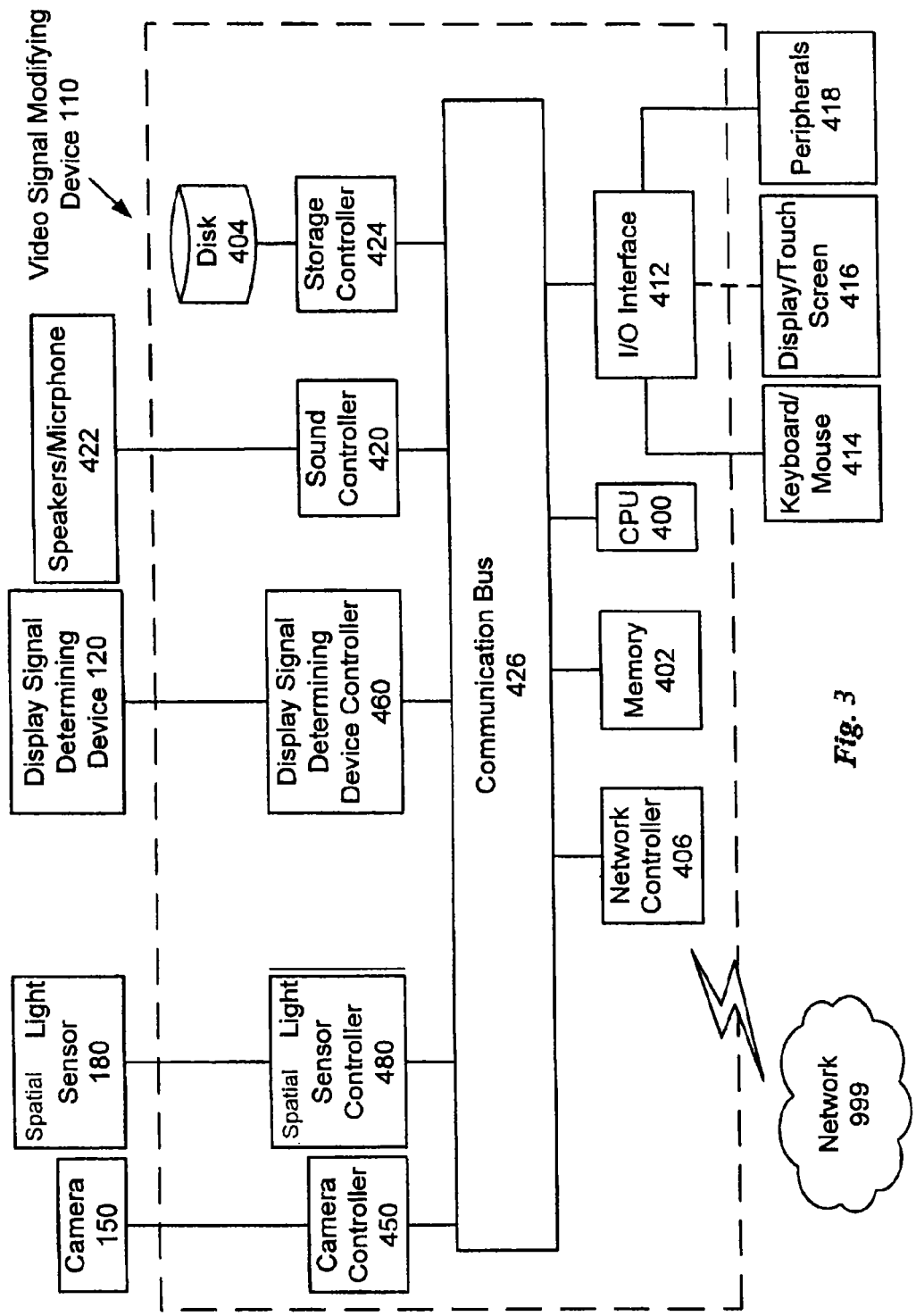
FIG. 3 is an example schematic block diagram of an embodiment of a video signal modifying device.

In FIG. 3, the video signal modifying device 110 includes a CPU 400 which performs the processes described above. The process data and instructions may be stored in memory 402. These processes and instructions may also be stored on a disk 404 such as a hard drive (HDD) or portable storage medium or may be stored remotely. Further, the present technological advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the video signal modifying device 110 communicates, such as a server or a computer.

Further, the present technological advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

CPU 400 may be a Xenon or Core processor from Intel of America or an Opteron processor from AMD of America, or may be other processor types that would be recognized by one of ordinary skill in the art. Alternatively, CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The video signal modifying device 110 in FIG. 3 also includes a network controller 406, such as an Intel Ethernet PRO network interface card from Intel Corporation of America, for interfacing with network 999. As can be appreciated, the network 999 can be a public network, such as the Internet, or a private network such as an LAN or WAN network, or any combination thereof and can also include PSTN or ISDN sub-networks. The network 999 can also be wired, such as an Ethernet network, or can be wireless such as a cellular network including EDGE, 3G and 4G wireless cellular systems. The wireless network can also be WiFi, Bluetooth, or any other wireless form of communication that is known.

The video signal modifying device 110 further includes an I/O interface 412 that interfaces with a keyboard/mouse 414 as well as a display/touch screen 416. I/O interface 412 also connects to a variety of peripherals 418 including printers and scanners, such as an OfficeJet or DeskJet from Hewlett Packard.

A sound controller 420 is also provided in the video signal modifying device 110, such as Sound Blaster X-Fi Titanium from Creative, to interface with speakers/microphone 422 thereby providing sounds and/or music. The speakers/microphone 422 can also be used to accept dictated words as commands for controlling the video signal modifying device 110 or for providing location and/or property information with respect to the target property.

The storage controller 424 connects the disk 404 with communication bus 426, which may be an ISA, EISA, VESA, PCI, or similar, for interconnecting all of the components of the computer.

A camera controller 450 is provided in the video signal modifying device 110 to interface with the camera 150, thereby providing the non-modified video signal 152.

A spatial sensor controller 480 is provided in the video signal modifying device 110 to interface with the spatial sensor 180, thereby providing the spatial signal 182.

A display signal determining device controller 460 is provided in the video signal modifying device 110 to interface with the display signal determining device 120, thereby providing the display signal 122.

Further, the technical advancements described herein may be applicable to other fields involving the processing of a video image.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:
    obtaining, with an image processing apparatus, a white point that corresponds to an image captured by a camera with only the natural light as a light source;
    obtaining, with the image processing apparatus, a white point that corresponds to an image captured by the camera with only a high efficiency artificial light as a light source;
    determining, with a spatial sensor of the image processing apparatus, a ratio of an intensity of near infrared light in natural light for a pixel to an intensity of high efficiency artificial light for the pixel within an image captured by a camera under mixed illumination of the natural light and the high efficiency artificial light; and
    determining, with the image processing apparatus, a white point for the pixel in the image under mixed illumination based on the ratio of the intensity of near infrared light to the intensity of high efficiency artificial light for the pixel in the image, the white point for only the natural light, and the white point for only the high efficiency artificial light.

2. The method of claim 1, wherein the natural light is sunlight and the high efficiency artificial light is light from a fluorescent light source, compact fluorescent light source, or a light emitting diode.

3. The method of claim 1, wherein the obtaining steps each include reading the respective white points from a memory.

4. The method of claim 1, wherein the spatial sensor and the camera are a co-axial camera with a channel for near infrared light and a channel for visible light.

5. The method of claim 1, wherein the spatial sensor is co-axial with the camera.

6. The method of claim 1 wherein the spatial sensor has some, but less than all, pixels that are near infrared sensitive.

7. The method of claim 1, wherein the intensity of high efficiency artificial light is a measure of red light.

8. A system comprising:
   a camera that captures an image under mixed illumination of natural light and high efficiency artificial light;
   a processor that obtains a white point that corresponds to an image captured by a camera with only the natural light as a light source, obtains a white point that corresponds to an image captured by the camera with only the high efficiency artificial light as a light source, determines a ratio of an intensity of natural light for a pixel to an intensity of high efficiency artificial light for the pixel within an image captured by a camera under mixed illumination of the natural light and the high efficiency artificial light, and determines a white point for the pixel in the image under mixed illumination based on the ratio of the intensity of natural light to the intensity of high efficiency artificial light for the pixel in the image, the white point for only the natural light, and the white point for only the high efficiency artificial light; and
   a spatial sensor that measures near infrared light, wherein the processor uses an output of the spatial sensor to determine the ratio.

9. The system of claim 8, wherein the natural light is sunlight and the high efficiency artificial light is light from a fluorescent light source, compact fluorescent light source, or a light emitting diode.

10. The system of claim 8, further comprising a memory, wherein the processor obtains the white point that corresponds to the image captured by the camera with only the natural light as the light source from the memory and obtains the white point that corresponds to the image captured by the camera with only the high efficiency artificial light as the light source from the memory.

11. The system of claim 8, wherein the spatial sensor and the camera are a co-axial camera with a channel for near infrared light and a channel for visible light.

12. The system of claim 8, wherein the spatial sensor is co-axial with the camera.

13. The system of claim 8, wherein the spatial sensor has some, but less than all, pixels that are near infrared sensitive.

14. The system of claim 8, wherein the processor determines the ratio by determining a ratio of red light to the near infrared light.

15. A non-transitory computer readable storage medium encoded with instructions, which when executed by an image processing apparatus causes the image processing apparatus to execute a method comprising:
   obtaining, with an image processing apparatus, a white point that corresponds to an image captured by a camera with only the natural light as a light source;
   obtaining, with an image processing apparatus, a white point that corresponds to an image captured by a camera with only the natural light as a light source;
   obtaining, with the image processing apparatus, a white point that corresponds to an image captured by the camera with only a high efficiency artificial light as a light source;
   determining, with the image processing apparatus, a ratio of an intensity of infrared light in natural light for a pixel to an intensity of high efficiency artificial light for the pixel within an image captured by a camera under mixed illumination of the natural light and the high efficiency artificial light; and
   determining, with the image processing apparatus, a white point for the pixel in the image under mixed illumination based on the ratio of the intensity of the near infrared light in the natural light to the intensity of high efficiency artificial light for the pixel in the image, the white point for only the natural light, and the white point for only the high efficiency artificial light.

16. The non-transitory computer readable storage medium of claim 15, wherein the image processing apparatus determines the ratio by calculating a ratio of red light to the near infrared light 17. The non-transitory computer readable storage medium of claim 15, wherein the neat infrared light a spatial sensor that measures the near infrared light.

* * * * *